Feb. 27, 1923.
B. M. W. HANSON
THREAD GAUGE
Filed Nov. 7, 1921
1,446,645
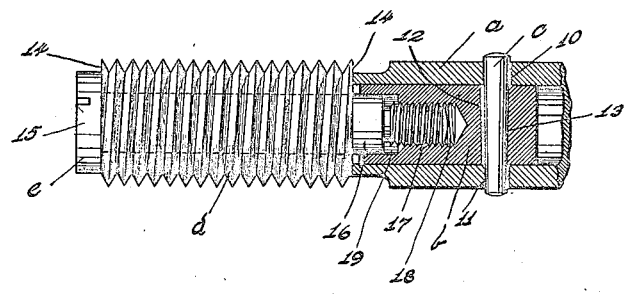
Inventor
Bengt M W Hanson
By T. Clay Lindsey.
His Attorney Patented Feb. 27, 1923.

1,446,645

UNITED STATES PATENT OFFICE.

BENGT M. W. HANSON, OF HARTFORD, CONNECTICUT.

THREAD GAUGE.

Application filed November 7, 1921. Serial No. 513,551.

*To all whom it may concern:*

Be it known that I, BENGT M. W. HANSON, a citizen of the United States, and resident of Hartford, county of Hartford, State of Connecticut, have invented certain new and useful Improvements in a Thread Gauge, of which the following is a specification.

The aim of the present invention is to provide a thread gauge having various features of novelty and advantage, and which is particularly characterized by its simplicity in construction, economy in manufacture and the security and ease with which the screw plug is fastened in place.

The figure in the accompanying drawing is an elevational view, partly in section, of a device embodying the present invention.

Referring to the drawing in detail, $a$ denotes a handle; $b$ a block fastened in place in the handle by a wedge $c$, and $d$ denotes a threaded gauge plug secured to the block $b$ by a screw $e$.

The handle $a$ is preferably made from tubular stock, thus making for cheapness in manufacture and lightness in weight. The wedge $c$ extends through diametrically disposed openings 10, 11 in the handle and a registering opening 12 in the block, the latter opening along its innermost side being tapered as at 13. The gauge plug $d$ comprises a cylindrical member threaded from end to end and with its surfaces 14, 14 flat and perpendicular to the axis of the plug. The screw $e$ has a head 15 overlying the outer end of the screw plug, a stem 16 extending through an axial opening in the plug $d$, and an inner threaded end 17 adapted to be screwed into a threaded recess 18 in the forward end of the block $b$. The recess 18 is counterbored as at 19 so as to snugly receive the stem 16 of the screw. The head 15 of the screw is preferably of substantially the same diameter as the diameter of the plug measured at the root of the thread.

In securing the screw plug in place, the wedge $c$ is held in partially withdrawn position, and the screw 15 is then turned by means of a screw-driver (the blade of which is inserted in the kerf in the head of the screw) until the rear end of the plug is held under pressure against the end of the handle. The wedge $c$ is then driven home, thus forcing the block $b$ inwardly of the handle and urging the plug against the end of the handle with considerable force. By the use of the wedge, the parts are held so tightly and securely in position that there is no no possibility of the plug turning relative to the handle or the parts becoming loose, which might be the case if the screw alone were relied upon to hold the parts in position.

Since the plug has no bosses or projections at its ends which would require machining, this screw plug may be more economically manufactured. The plug is reversible so that in the event one face of the thread thereon becomes worn, the plug may be turned end for end and the other face of the thread employed for gauging purposes. The head of the screw $e$, which may be easily machined, serves as a guide for bringing the plug into the threaded opening to be gauged, irrespective of which end of the plug is foremost.

It will be seen from the foregoing description that I provide a thread gauge which is very simple in construction and wherein the parts are securely fastened in place.

It is, of course, obvious that my invention is susceptible of various modifications and changes which are within the spirit of the invention without departing from the scope of the following claims, it being understood that the present disclosure of my invention is by way of illustration only and it is not to be taken as restrictive of my conception.

I claim as my invention:—

1. A device of the character described including a handle, an adjustable part carried thereby, a gauge member, rotatable means for securing said member to said part, and means for binding said part relative to said handle.

2. A device of the character described including a handle, an adjustable part carried thereby, a screw gauge member, screw threaded means for securing said member to said part, and a wedge for adjusting and fastening said part relative to said handle.

3. A device of the character described including a handle, a block adjustably carried thereby, a gauge member, a screw securing said member to said block, and a wedge cooperating with said handle and block for securing the latter in place with said member tightly engaged against said handle.

4. A device of the character described including a tubular handle having diametrically opposite openings, a block slidably mounted in said handle and having an opening registering with the openings thereof, a screw plug abutting said handle, a screw extending through said plug and having threaded engagement with said block, and a wedge positioned in the openings of said handle and block.

5. A device of the character described including a handle, a cylindrical screw plug having a through bore, and a screw extending through said bore and cooperatively connected to said handle, said screw having a head engaging and extending beyond the outer end of said plug, said head being of substantially the same diameter as the root of the thread on said plug and constituting a guide for directing the plug into the threaded opening to be gauged.

6. A device of the character described comprising a tubular handle having transverse openings adapted to receive a wedge, a block slidably mounted in said handle and having a tapered opening registering with said transverse openings, a reversible screw plug either end of which is adapted to abut against said handle, a screw extending through said plug and having threaded engagement with said block, and a wedge in said openings, said screw having a head abutting against and extending beyond the outer end of the plug and constituting guide means for directing the plug into the threaded opening to be gauged.

BENGT M. W. HANSON.